(12) United States Patent
Bost

(10) Patent No.: US 10,123,523 B2
(45) Date of Patent: Nov. 13, 2018

(54) CORNER INSECT TRAP

(71) Applicant: Tony Bost, Sumner, TX (US)

(72) Inventor: Tony Bost, Sumner, TX (US)

( * ) Notice: Subject to any disclaimer, the term of this patent is extended or adjusted under 35 U.S.C. 154(b) by 278 days.

(21) Appl. No.: 15/018,752

(22) Filed: Feb. 8, 2016

(65) Prior Publication Data
US 2017/0223944 A1 Aug. 10, 2017

(51) Int. Cl.
*A01M 1/14* (2006.01)
*A01M 1/02* (2006.01)
*A01M 1/10* (2006.01)

(52) U.S. Cl.
CPC .......... *A01M 1/14* (2013.01); *A01M 1/02* (2013.01); *A01M 1/103* (2013.01)

(58) Field of Classification Search
CPC ........................................ A01M 1/14
USPC ............................................ 43/114
See application file for complete search history.

(56) References Cited

U.S. PATENT DOCUMENTS

| | | | | |
|---|---|---|---|---|
| 827,006 A * | 7/1906 | Gathmann | .......... | A01M 1/14 43/115 |
| 862,467 A * | 8/1907 | Gardiner | .......... | A01M 1/14 43/114 |
| 935,428 A * | 9/1909 | Stranzenbach | .......... | A01M 1/14 43/114 |
| 1,071,578 A * | 8/1913 | Rese | .......... | A01M 1/14 43/114 |
| 1,087,058 A * | 2/1914 | Zielfeldt | .......... | A01M 1/14 43/114 |
| 1,112,064 A * | 9/1914 | Gordon | .......... | A01M 1/02 43/114 |
| 1,225,556 A * | 5/1917 | Allen | .......... | A01M 1/14 43/113 |
| 1,392,156 A * | 9/1921 | Heller | .......... | A01M 1/14 43/115 |
| 1,451,583 A * | 4/1923 | McCardia | .......... | A01M 1/14 43/115 |
| 1,521,261 A * | 12/1924 | Tschernitschek | .......... | A01M 1/14 43/114 |
| 2,177,670 A * | 10/1939 | Peirson | .......... | A01M 1/02 43/107 |

(Continued)

FOREIGN PATENT DOCUMENTS

| AT | 1229 U1 * | 1/1997 | | |
|---|---|---|---|---|
| CA | 2523301 A1 * | 11/2004 | .......... | A01M 1/14 |

(Continued)

OTHER PUBLICATIONS

Translation of KR 10-1433873.*

*Primary Examiner* — Darren W Ark
(74) *Attorney, Agent, or Firm* — Law Office of Jeff Williams; J. Oliver Williams

(57) ABSTRACT

The present invention pertains to a device that is designed to specifically be mounted to any available corner wherein the device will entrap spiders and other insects that go into various corners. The device is formed in a double-sided equilateral triangular shape. The device includes an aperture for an entry point for spiders and other insects to enter and become trapped on the backside of the device which includes a capturing adhesive. The front side of the device is designed to blend with various interior designs. The device will have grabbing points near the vertices of the device that allow the user to safely remove the device.

14 Claims, 2 Drawing Sheets

(56) References Cited

U.S. PATENT DOCUMENTS

| | | | | |
|---|---|---|---|---|
| 2,258,683 A * | 10/1941 | Ketterer | ............... | A01M 1/02 43/114 |
| 2,603,485 A * | 7/1952 | Countryman | ............ | A63H 3/00 428/16 |
| 3,913,259 A * | 10/1975 | Nishimura | ............... | A01M 1/02 43/114 |
| 4,133,137 A * | 1/1979 | van Adelsberg | ........ | A01M 1/02 229/116 |
| 4,161,079 A * | 7/1979 | Hill | ................... | A01M 23/005 43/114 |
| 4,217,722 A * | 8/1980 | McMullen | ............ | A01M 1/14 43/114 |
| 4,244,134 A * | 1/1981 | Otterson | ............ | A01M 23/005 43/114 |
| 4,349,981 A * | 9/1982 | Sherman | ............ | A01M 25/004 43/114 |
| 4,425,731 A * | 1/1984 | Orlando | ............ | A01M 23/005 229/115 |
| 4,709,504 A * | 12/1987 | Andric | ................... | A01M 1/14 43/114 |
| 4,800,671 A * | 1/1989 | Olson | ................... | A01M 1/18 43/108 |
| 4,807,391 A * | 2/1989 | Bokiau | ................. | A01M 1/02 43/131 |
| 4,829,702 A * | 5/1989 | Silvandersson | ........ | A01M 1/14 43/114 |
| 4,862,638 A * | 9/1989 | Stevenson | ............... | A01M 1/14 428/40.1 |
| 4,876,823 A * | 10/1989 | Brunetti | ............... | A01M 1/14 43/114 |
| 4,959,924 A * | 10/1990 | Martin | ................. | A01M 1/14 43/114 |
| 5,022,179 A * | 6/1991 | Olson | ................... | A01M 1/14 43/114 |
| 5,182,879 A * | 2/1993 | Hopkins | ................. | A01M 1/04 43/131 |
| 5,303,501 A * | 4/1994 | Seemann | ............... | A01M 1/026 43/114 |
| 5,384,981 A * | 1/1995 | Cohen | ................... | A01M 1/14 43/114 |
| 5,396,729 A * | 3/1995 | Vejvoda | ................. | A01M 1/02 43/114 |
| 5,531,043 A * | 7/1996 | Shiboh | ................. | A01M 1/14 43/121 |
| 5,608,988 A * | 3/1997 | Dowling | ................. | A01M 1/14 43/114 |
| 5,649,385 A * | 7/1997 | Acevedo | ................. | A01M 1/14 43/114 |
| 5,815,981 A * | 10/1998 | Dowling | ................. | A01M 1/14 43/114 |
| 6,178,687 B1 * | 1/2001 | Frisch | ................... | A01M 1/14 43/114 |
| 6,516,558 B1 * | 2/2003 | Lingren | ................. | A01M 1/02 43/107 |
| 7,089,701 B2 * | 8/2006 | Frisch | ................... | A01M 1/14 43/114 |
| 7,676,985 B1 * | 3/2010 | Perkins | ................. | A01M 1/026 43/114 |
| 7,748,159 B1 * | 7/2010 | Wenner | ................. | A01M 1/24 43/114 |
| 8,104,223 B1 * | 1/2012 | Rodriguez | ............... | A01M 1/14 43/114 |
| 8,240,081 B2 * | 8/2012 | Cuellar Bernal | ..... | A01M 1/145 43/107 |
| 8,250,803 B1 * | 8/2012 | Kanno | ................... | A01M 1/14 43/114 |
| 8,276,314 B2 * | 10/2012 | Duehl | ................... | A01M 1/103 43/107 |
| 8,371,064 B2 * | 2/2013 | Watson | ................. | A01M 1/14 43/114 |
| 8,793,927 B2 * | 8/2014 | Winkler | ................. | A01M 1/14 43/107 |
| 9,066,508 B2 * | 6/2015 | Aroniss | ................. | A01M 1/106 |
| 9,521,837 B2 * | 12/2016 | Banfield | ............... | A01M 1/106 |
| 2004/0020104 A1 * | 2/2004 | Feldhege | ............... | A01M 1/02 43/114 |
| 2004/0079025 A1 * | 4/2004 | Snell | ..................... | A01M 1/026 43/131 |
| 2006/0283076 A1 * | 12/2006 | Chambers | ............... | A01M 1/02 43/114 |
| 2009/0183419 A1 * | 7/2009 | Harris | ..................... | A01M 1/14 43/114 |
| 2010/0107515 A1 * | 5/2010 | Harrington | ............. | A01M 1/14 52/101 |
| 2012/0266520 A1 * | 10/2012 | Strube | ..................... | A01M 1/02 43/114 |
| 2012/0291336 A1 * | 11/2012 | Friend | ..................... | A01M 1/14 43/114 |
| 2012/0324779 A1 * | 12/2012 | Kovacs | ..................... | A01M 1/14 43/107 |
| 2015/0007486 A1 * | 1/2015 | Backmark | ............ | A01M 1/2011 43/114 |
| 2015/0047250 A1 * | 2/2015 | Parks | ..................... | A01M 1/14 43/114 |
| 2016/0183511 A1 * | 6/2016 | Dong | ..................... | A01M 1/14 43/114 |
| 2016/0198692 A1 * | 7/2016 | Simpson | ................. | A01M 1/14 43/114 |

FOREIGN PATENT DOCUMENTS

| | | | | |
|---|---|---|---|---|
| DE | 29607701 U1 * | 7/1996 | ............. | A01M 1/14 |
| EP | 0026419 A1 * | 4/1981 | ............. | A01M 1/02 |
| EP | 26419 A1 | 4/1981 | | |
| EP | 2210488 A2 * | 7/2010 | ............. | A01M 1/14 |
| EP | 2721928 A1 * | 4/2014 | ............. | A01M 1/02 |
| FR | 2750572 A1 * | 1/1998 | ............. | A01M 1/02 |
| GB | 1478877 A * | 7/1977 | ............. | A01M 1/14 |
| GB | 1507696 A * | 4/1978 | ............. | A01M 1/02 |
| GB | 2148686 A * | 6/1985 | ............. | A01M 1/14 |
| GB | 2167282 A * | 5/1986 | ............. | A01M 1/14 |
| GB | 2180135 A * | 3/1987 | ............. | A01M 1/14 |
| GB | 2180135 B * | 2/1988 | ............. | A01M 1/14 |
| GB | 2210543 A * | 6/1989 | ............. | A01M 1/14 |
| JP | 01063329 A * | 3/1989 | | |
| JP | H057081 U * | 2/1993 | | |
| JP | 05236858 A * | 9/1993 | ............. | A01M 1/02 |
| JP | H0638549 U * | 5/1994 | | |
| JP | H0638551 U * | 5/1994 | | |
| JP | 6029979 Y2 * | 8/1994 | | |
| JP | H0675178 U * | 10/1994 | | |
| JP | 09299014 A * | 11/1997 | | |
| JP | 2001069894 A * | 3/2001 | | |
| JP | 2001352889 A * | 12/2001 | | |
| JP | 2002142642 A * | 5/2002 | | |
| JP | 2002205904 A * | 7/2002 | | |
| JP | 2002253101 A * | 9/2002 | | |
| JP | 2002253102 A * | 9/2002 | | |
| JP | 2003339293 A * | 12/2003 | | |
| JP | 2004261106 A * | 9/2004 | | |
| JP | 2005124532 A * | 5/2005 | | |
| JP | 2005245279 A * | 9/2005 | | |
| JP | 2006101758 A * | 4/2006 | | |
| JP | 2006136296 A * | 6/2006 | | |
| JP | 2006311802 A * | 11/2006 | | |
| JP | 2010252769 A * | 11/2010 | | |
| JP | 2011024450 A * | 2/2011 | | |
| JP | 2012110265 A * | 6/2012 | | |
| JP | 2012239443 A * | 12/2012 | | |
| KR | 100895507 B1 * | 5/2009 | | |
| KR | 20100029731 A * | 3/2010 | | |
| KR | 20100009079 U * | 9/2010 | | |
| KR | 101105834 B1 * | 1/2012 | | |
| KR | 200464505 Y1 * | 1/2013 | | |
| KR | 20130080954 A * | 7/2013 | | |
| KR | 101433873 B1 * | 8/2014 | | |
| RU | 2056752 C1 * | 3/1996 | | |
| WO | WO-9707673 A1 * | 3/1997 | ............. | A01M 1/14 |
| WO | WO-9848619 A1 * | 11/1998 | ............. | A01M 1/023 |
| WO | WO-9934672 A1 * | 7/1999 | ............. | A01M 1/02 |

(56) References Cited

FOREIGN PATENT DOCUMENTS

| WO | WO-0059300 A1 | * | 10/2000 | ............ | A01M 1/14 |
| WO | WO-2007035089 A1 | * | 3/2007 | ............ | A01M 1/145 |
| WO | WO-2014115246 A1 | * | 7/2014 | ............ | A01M 1/14 |
| WO | WO-2017069220 A1 | * | 4/2017 | ............ | A01M 1/02 |

* cited by examiner

CORNER INSECT TRAP

BACKGROUND

1. Field of the Invention

The present application relates to a device and method of capturing insects, and more particularly to a device for attachment into elevated corners for attracting and capturing assorted insects.

2. Description of Related Art

It is highly undesirable to tolerate the presence of insects within a home or dwelling, whether it be a commercial or residential dwelling. Insects can carry diseases and are generally unhealthy for human and pet exposure. Millions of dollars each year is spent on the treatment and eradication of insects from dwellings. Typically sprays are used or assorted traps. The sprays are generally applied along the baseboard and are used to help prevent the entrance of insects into the home. Powders may also be used similarly to that of sprays. The powders can be applied around plumbing spaces, such as under the sinks. Traps are used to capture insects that have already entered the dwelling. These are laid on a surface and wait for the insect to pass inside and become trapped. The surfaces are relatively flat and close to the ground. Although these types of devices and treatment methods have some effect, none appear able to handle insects that remain in the upper portions of the dwellings.

For example, spiders typically stay away from the lower levels of the home and can be found around the ceiling. Insects (especially spiders) are intensely attracted to corners during their hunt for other insects and a place of desired living. The spiders that go into corners do so mainly because of the webbing techniques due to the various angles, the darker shadows which are typically found in corners yielding privacy, and the heat factor (more relative to corners near ceilings) where the spiders find for suitable as well as other insects which they can expect to travel to these corners also.

However, none of the traps and spray treatment methods described adequately address the presence and deterrence of insects in the upper corners of the dwellings. Although some strides have been made with respect to pest control methods, considerable shortcomings remain.

SUMMARY OF THE INVENTION

The device of the present application is widely needed through many homes, business, hospitals, schools and any other area high or low where there is a corner that spiders and other insects can go to. The current device is designed to be distinct in its use by being configured for direct application to the corners of various areas to entrap spiders and other insects for pest control purposes.

An object of the device of the present application is to entrap spiders and other insects within corners as a form of eliminating pests/insects inside and outside homes, businesses, schools, underneath tables, beds, and anywhere else where the device may be found needful because of its beneficial capabilities.

Another object of the device of the present application is to provide a method of attracting the insects to come into contact with the device. A pheromone or other type of baiting technique is possible.

Typical places for use are closets, attics, bedrooms, kitchens, living rooms, bathrooms, and other rooms where spiders will be attracted to the corners (especially near the ceilings). These locations are appealing for insects for many reasons, such as visibility of all surroundings for a sense of security, webbing techniques, shadowed areas, and warmer climates which naturally lure the insects (especially spiders) to these corners. The device may be placed into corners and left alone until the user decides to either remove the device at their convenience to dispose of any entrapped spiders other insects/pests to then replace the device and/or setup these devices in new areas to eventually maintain greater control over insects/pests (especially spiders) from ever gathering into corners again since the pests feed in these areas and multiply rapidly.

Another object of the device of the present application is to include stylistic indicia along the front face of the device to blend well with the various interior designs of businesses, homes, schools, and other places for the appreciated usage of the device.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
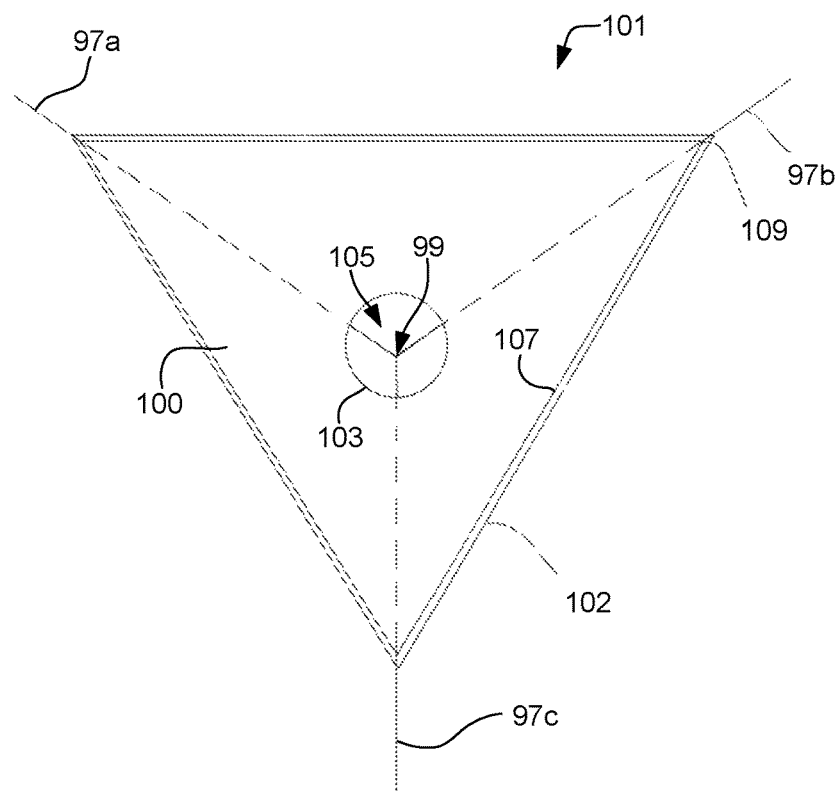
FIG. 1 is a perspective view of an insect trapping device according to the preferred embodiment of the present application.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with conventional insect treatment methods and devices. The device is configured to adhere at the intersection of a concave corner so as to create a void space between itself and the wall/ceiling. Insects pass into the device as it is suspended and secured to the walls/ceiling with an adhesive. Once into the void space, the insects are trapped through contact with a substance area designed to bind to the insect and prevent their ability to flee. The device is removable without the cause of damage to the surfaces of the walls/ceilings. These and other unique features of the device are discussed below and illustrated in the accompanying drawings.

The device and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. The device includes a facial member/structure formed into a particular contoured shape. The facial member includes an adhesive layer around a portion of its periphery along one or more edges to secure the facial member into a concave corner in a dwelling. Placement of the facial member over the corner creates a void space. Insects are able to enter the void space through at least one or a gap between the facial member and the wall/ceiling and an aperture. The device further includes a substance area having an adhesive configured to capture and secure insects within the void space as they contact such area.

Referring now to the drawings wherein like reference characters identify corresponding or similar elements in form and function throughout the several views. FIG. 1 illustrates the corner insect trapping device 101 of the present application. Device 101 includes a structure 100 located adjacent a corner 99 of a dwelling. The corner 99 is defined by the point of location of a plurality of walls and a ceiling. The edges, or joints of the walls/ceilings are defined by lines 97a-97c. Joints 97a and 97b define the line between the ceiling and both walls. Joint 97c defines the line between the walls. Device 101 engages one or more joints 97a-c and defines a void space 105 between a back surface of device 101 and corner 99.

Device 101 is designed specifically to be placed in corners of rooms within houses, businesses, schools, corners high and low and even underneath beds and tables in any corner where the device can be found useful and used appropriately, which is designed to confine and entrap spiders and other insects of any sort. There are more corners in a home, business, school, restaurant, or other dwelling that this device has a naturally excellent benefit to offer any user almost anywhere since spiders specifically desire the corners of various rooms and environments over any other area combined. The device of the present application is substantially a 3-dimensional object, formed in the shape of an equilateral triangle with 60 degree angles that allow device 101 to be placed flush-like into any corner to function as intended. The equilateral-triangular device may have a front surface 104 which is designed to blend with the interior environments of home and business wall designs for the user when the device is in use. This indicia may be placed on by the user or come pre-printed by the manufacturer.

Figure 2:
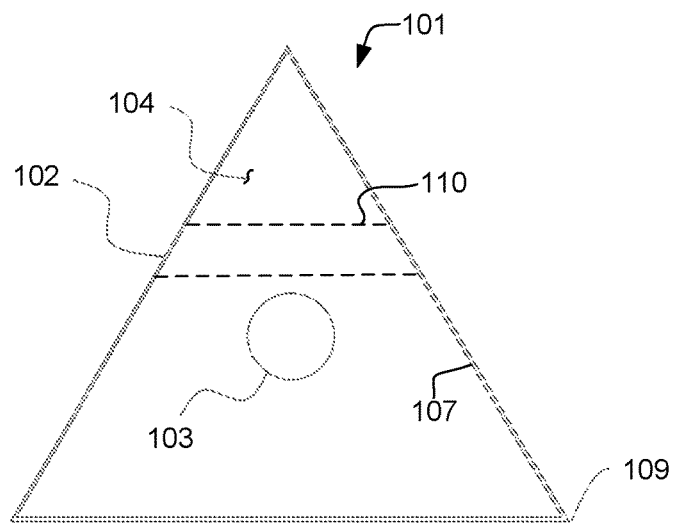
FIG. 2 is a front view of the insect trapping device of FIG. 1.

Referring now also to FIG. 2 in the drawings, a front view of device 101 is illustrated. As seen in the figures, device 101 is formed in the shape of an exact or approximate equilateral triangle with near 60 degree vertices so that when the device is placed into a corner it will fit substantially flush and snug so as to be appropriately mounted for the users benefit of entrapping and eliminating spiders and other insects in void space 105.

Device 101 includes a plurality of edges 107 that meet together to form one or more vertices 109. Vertices 109 are configured to fit within joints 97a-c such that edges 107 contact at least one of the walls/ceiling. An adhesive 102 is included and applied to one or more portions of edges 107. Adhesive 102 is configured to secure device 101 to the walls and/or ceilings and is a removable and nondestructive adhesive to avoid damaging interior surfaces and paints. Device 101 may be positioned (mounted) into a corner high or low (near the floor or against the ceiling) by lining up each of the 3 vertices of the equilateral triangular device with each of 3 edges (lines) where the left and right walls intersect with the ceiling, or where the left or right walls intersect with the floor (or anywhere else a corner is similarly found to use the device accordingly. Device 101 may also be placed where 2 edge lines 102 intersect. The triangular walled device 101 may adhere to the joints in which it is mounted by adhesive 102 along portions of edges 107. Device 101 may be oriented at various relative positions relative to corner 99.

It is understood that other embodiments may have corners 109 angled at either more or less than 60 degrees to allow for the different styled corners within the dwelling to be received by device 101. Device 101 is not herein limited to an equilateral triangle but is merely one exemplary form device 101 may take. Likewise, device 101 may be formed into other shapes as necessary for adaptation to corner 99. Examples may include shapes having more than 3 vertices 109.

Device 101 further includes aperture 103 for the passage of insects into void space 105. Aperture 103 is ideally centrally position and passes through device 101. It is designed such that insects enter into void space 105 by passing through aperture 103. Void space 105 is dark and protective in nature and is appealing to many insects. It is understood that aperture 103 is not herein limited to the circular shape depicted. One or more apertures may be used in device 101 and each may have any sort of shape desired. For example, aperture 105 may be shaped in a rectangular shape.

It should be noted that device 101 of the present application may optionally include a surface indicia 110 corresponding to the indicia found on the walls and ceiling as stated briefly previously. Furthermore, device 101 may be formed from transparent/translucent material so a user can physically see if any insects are trapped in void space 105. Device 101 has a relatively thin cross section, for example approximately ⅛ inch thick so to provide durability. Additionally, device 101 may be formed from wood, metal and/or plastic or other appropriate material. The presently described device is designed to be non-harmful to pets/children in that these traps remain mounted in their specified place of usage within various corners until removed and replaced by another one of the devices.

Figure 3:
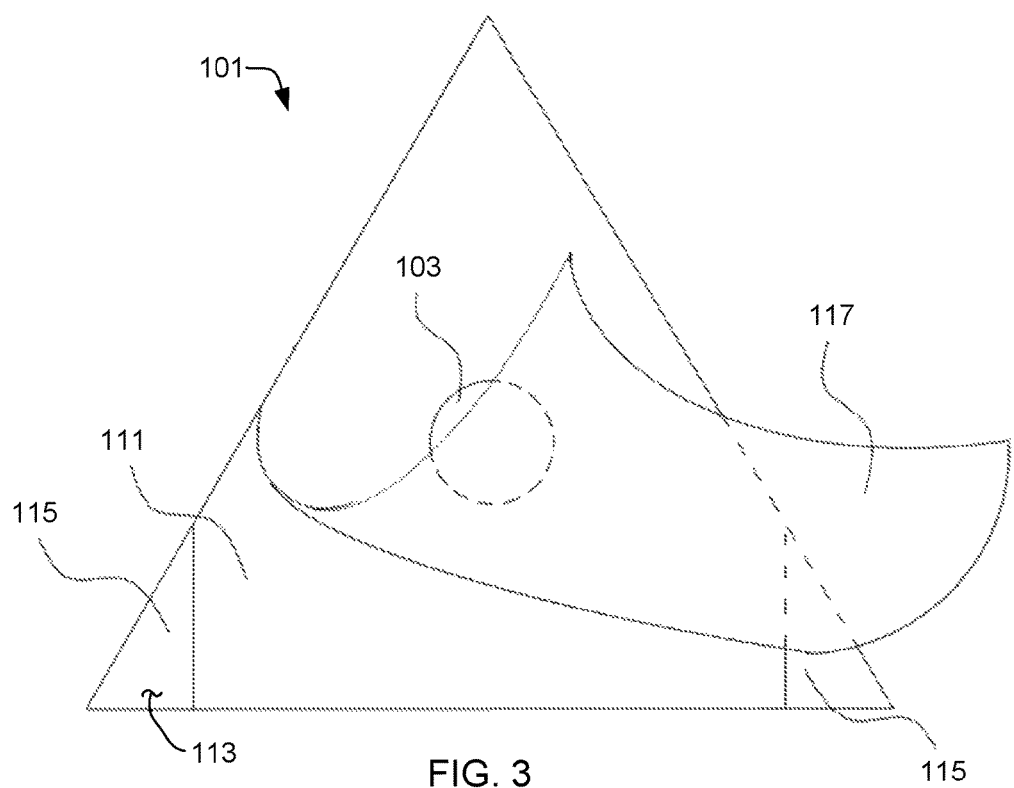
FIGS. 3 is a back view of the insect trapping device of FIG. 1 wherein a film cover is partially removed.
Figure 4:
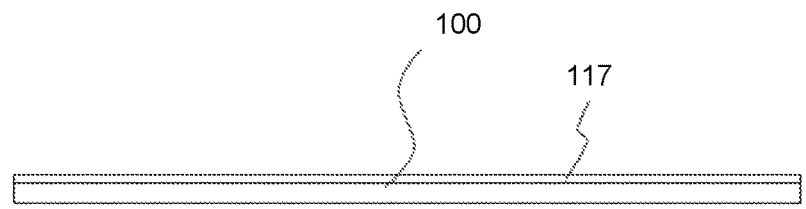
FIG. 4 is a side view of the insect trapping device of FIG. 1.

Referring now also to FIGS. 3 and 4 in the drawings, a back view and side view of device 101 is illustrated. Device 101 includes an entrapping portion or substance area 111. Area 111 is covered in a highly tacky and sticky adhesive configured to cease hold of insects so as to prevent their ability to flee away once contact has been made. Area 111 extends over a portion of back surface 113 opposite surface 104. It is preferred that the adhesive in area 111 is at least adjacent edges 107 and aperture 103 so as to capture the insects upon entry. Various embodiments of device 101 may elect to locate adhesive in area 111 over the entire surface 113 or partially across surface 113 as seen in FIG. 3.

FIG. 3 shows clear area 115 along surface 113. Area 115 is void of the adhesive of area 111 and allows the user to grasp device 101 so that the user can remove the device without touching the insects or adhesive to dispose or replace device 101.

FIG. 3 further illustrates film cover 117 being peeled away to expose the substance area 111. Cover 117 acts to protect substance area 111 and its adhesive from exposure to contaminants prior to use. Cover 117 is configured to be completely peeled away and disposed of. Where desired, cover 117 may be reapplied as necessary for transportation and/or storage.

Another feature of device 101 is the optional inclusion of a pheromone that attracts/lures insects to the device for improved effectiveness. The pheromone may be included with the adhesive of area 111 so as to emit a smell. Additionally, area 111 may be selectively located away from aperture 103 a set distance to allow the insect to enter fully into the void space before being captured. This is useful in that it helps to maintain a clear path of entry into the trap.

In operation, a user merely grabs hold of device 101 and aligns its edges with that of the edges in the room adjacent a particular corner. Adhesive along the edges of the device contact the walls/ceiling and secure the device at a desired orientation. Once secured, a void space is formed behind the device. Insects are attracted and permitted to enter into the void space. Once inside, contact with the adhesive of area 111 traps them inside. The device may be interchanged as desired.

The current application has many advantages over the prior art including at least the following: (1) simplified design; (2) corner applied insect trap device; (3) ability to lure insects to the trap; and (4) disposable and interchangeable design.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A device for entrapping and eliminating spiders and other insects in corners of a room comprising:
    a single flat structure having a plurality of corners and extending only in a single plane;
    an adhesive located along a periphery of a plurality of edges of the structure, the adhesive configured to secure the structure to at least one corner of the corners of the room as a flat structure maintaining the single plane, the structure configured to cover the at least one corner of the corners of the room, a void space being formed between the structure and the at least one corner of the corners of the room when the structure is secured to the at least one corner of the corners of the room, the void space being defined by the at least one corner of the corners of the room and a back surface of the structure;
    an aperture through the back surface of the structure configured to permit passage of insects to enter the void space; and
    a substance area on the back surface of the structure having a capturing adhesive configured to capture the spiders and other insects that enter into the void space.

2. The device of claim 1, wherein the structure is triangular.

3. The device of claim 2, wherein the triangular structure is formed in a shape of an equilateral triangle.

4. The device of claim 1, further comprising:
    a film cover configured to protect the capturing adhesive from contaminants prior to use.

5. The device of claim 4, wherein the film cover is detachable and disposable.

6. The device of claim 4, wherein the film cover is detachable and configured for reapplication over the capturing adhesive.

7. The device of claim 1, wherein the aperture is a circular aperture.

8. The device of claim 1, further comprising:
    indicia configured to blend with an interior design of a dwelling.

9. The device of claim 8, wherein the indicia is pre-printed on the structure.

10. The device of claim 8, wherein the indicia is applied by a user onto the structure.

11. The device of claim 1, further comprising:
    a pheromone configured to attract insects into the void space.

12. The device of claim 11, wherein the pheromone is emitted from the capturing adhesive.

13. The device of claim 11, wherein the pheromone is emitted from the structure.

14. The device of claim 1, further comprising:
    a clear area along the back surface of the structure, the clear area is free of the capturing adhesive and permits a user to grab hold of the structure for removal and disposal.

* * * * *